May 29, 1956 E. WILDHABER 2,747,468
MACHINE FOR PRODUCING GEARS
Filed Feb. 6, 1951 5 Sheets-Sheet 1

INVENTOR.
ERNEST WILDHABER
BY Richard W. Treverton
ATTORNEY

May 29, 1956

E. WILDHABER 2,747,468

MACHINE FOR PRODUCING GEARS

Filed Feb. 6, 1951

INVENTOR.
ERNEST WILDHABER

BY Richard W. Treverton

ATTORNEY

May 29, 1956 E. WILDHABER 2,747,468
MACHINE FOR PRODUCING GEARS
Filed Feb. 6, 1951 5 Sheets-Sheet 4

INVENTOR.
ERNEST WILDHABER
BY Richard W. Treverton
ATTORNEY

May 29, 1956  E. WILDHABER  2,747,468
MACHINE FOR PRODUCING GEARS
Filed Feb. 6, 1951  5 Sheets-Sheet 5

INVENTOR.
ERNEST WILDHABER
BY
Richard W. Treverton
ATTORNEY

United States Patent Office 2,747,468
Patented May 29, 1956

2,747,468

MACHINE FOR PRODUCING GEARS

Ernest Wildhaber, Brighton, N. Y., assignor to The Gleason Works, Rochester, N. Y., a corporation of New York Application February 6, 1951, Serial No. 209,665

14 Claims. (Cl. 90—6)

The present invention relates to improvements in gear producing machines having reciprocating cutting tools, such for example as the machines disclosed in Patents Nos. 1,616,439 and 1,799,883, and includes a mechanical motion that is covered by my co-pending application Serial No. 334,155, filed January 30, 1953.

In the machine disclosed in Patent No. 1,616,439 a cutting tool is reciprocated across a work gear to cut teeth thereon. The tool reciprocates upon a cradle which rotates in timed relation to rotation of the work gear, the arrangement being such that the path defined by the cutting edge of the tool simulates a tooth surface of an imaginary generating gear that is rotating in mesh with the work gear, the axis about which the cradle rotates representing the axis of the imaginary gear. The machine is of the continuous indexing type, the tool on each successive cutting stroke thereof operating in a successive (or later following) tooth space of the work gear. The rotation of the work gear which provides this continuous indexing action is a continuous rotation and as the tool moves across the face of the work gear it follows a curved path on the gear, so that the resulting tooth surfaces are curved from end to end, producing gears of either the spiral bevel or hypoid type depending upon whether the cradle and work gear axes intersect or are relatively offset.

The cutting tool is reciprocated by a crank, so that its motion is of a harmonic nature, its velocity being greatest near the center of its stroke which ordinarily occurs when the tool is near the lengthwise center of the tooth space being cut. Without some kind of corrective means this harmonic motion would cause the lengthwise curvature of the resulting gear teeth to be of generally S-shape, which is usually undesirable. Patent No. 1,616,439 provides corrective means in the form of a mechanism which superimposes upon the otherwise continuous rotation of the cradle a harmonic oscillation. This causes the cradle rotation to increase and decrease in velocity in phase with the harmonic increase and decrease in velocity of the tool, the overall effect being that while the absolute tool velocity varies substantially throughout the cutting stroke, the tool velocity is approximately constant in relation to cradle velocity; and hence gear teeth are cut which are curved, lengthwise, in one direction only.

The present invention has among its objectives the provision of means which will give the tool either a constant velocity, or a velocity which varies in a selected non-harmonic manner during the cutting stroke, which will therefore eliminate the need for superimposing a harmonic oscillation upon the otherwise continuously rotating cradle, and which will improve the cutting efficiency of the machine by causing the return stroke of the tool to be faster than the cutting stroke thereof. To meet these objectives the crank which operates the tool is rotated by a mechanical motion comprising a drive member and a driven member that are mounted on eccentric axes and have a pivotal connection to each other that is movable relative to each of them in a direction having a radial component. Cam means are provided to effect radial motion of this pivotal connection for varying the velocity ratio of the drive and driven members in such a way that with the drive member rotating at constant velocity the driven member is turned at minimum velocity during the cutting stroke of the tool and at a maximum velocity during part of the return stroke, and that while the tool is cutting it has the selected non-harmonic motion. By this arrangement the tool is actually cutting for a larger part of each rotation of the drive member than it is in the prior art arrangement, and a smaller part of each rotation is devoted to reversing the direction of motion of the tool and its return stroke, so that a shorter time is required to cut a gear.

The present invention also provides an improved means for modifying the lengthwise curvature of the gear teeth that are cut on the machine. In this way such curvatures of mating gears may be mismatched to thereby produce tooth bearings of whatever length is desired. According to the invention this change of curvature is effected by making the crank means, which serves to reciprocate the tool, adjustable in phase to the aforementioned constant velocity drive means.

The foregoing and other objects and advantages of the present invention will appear more fully from the following description of the machine shown in the accompanying drawings. In these:

Figure 1:
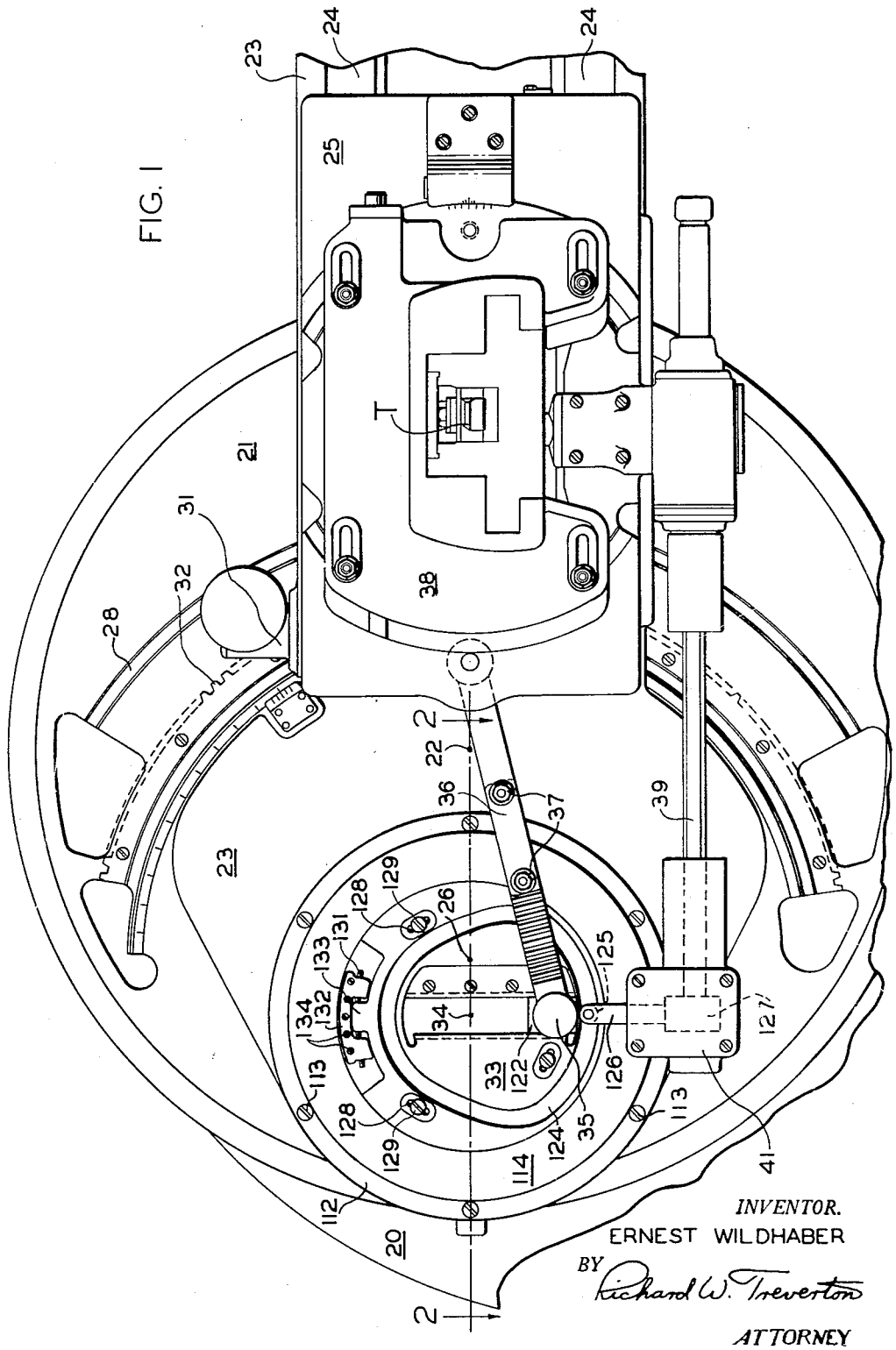
Fig. 1 is an elevational view of the cradle or tool carrying part of the machine.
Figure 2:
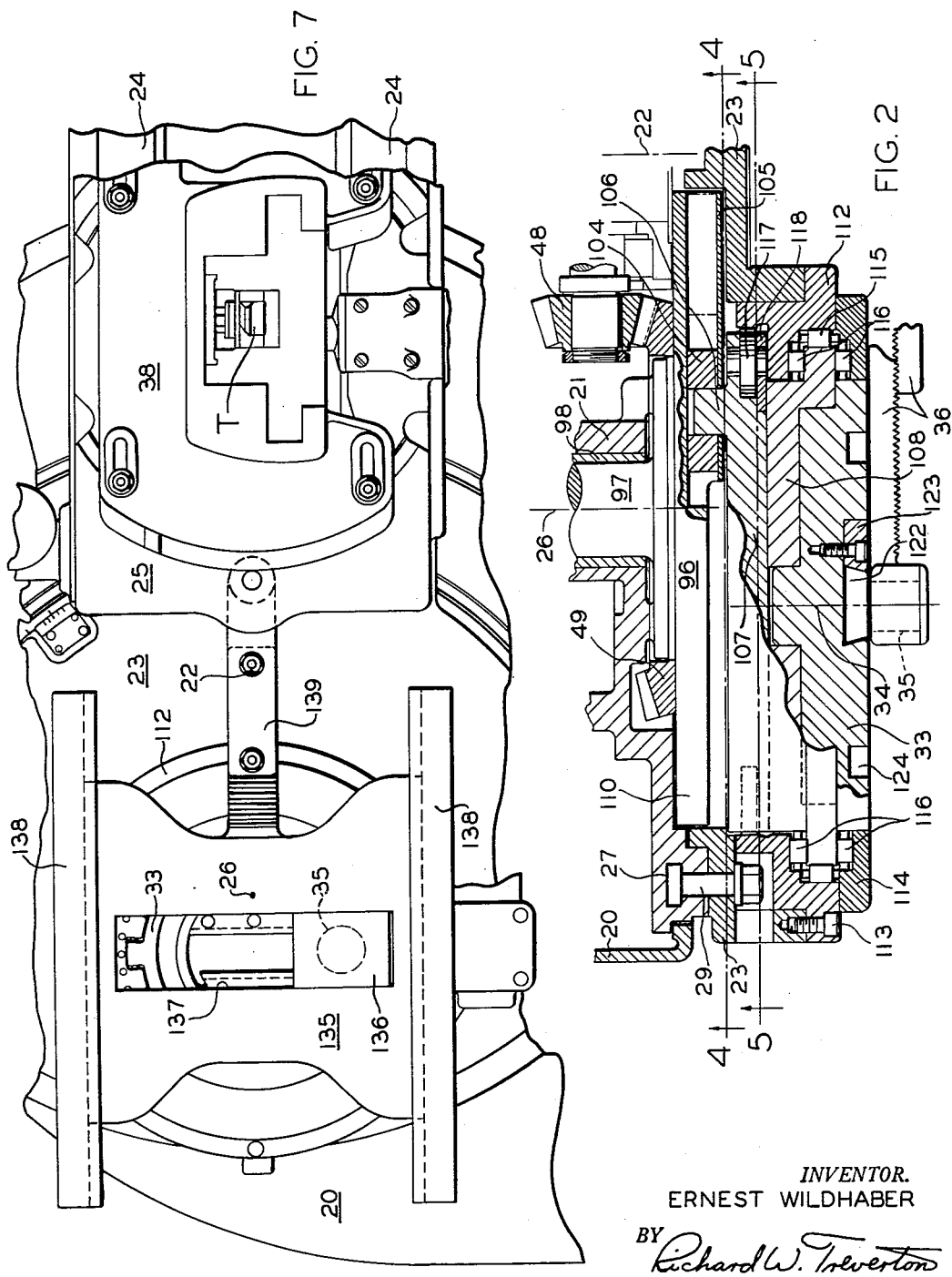
Fig. 2 is a fragmentary sectional view taken in the plane indicated by line 2—2 of Fig. 1.
Figure 4:
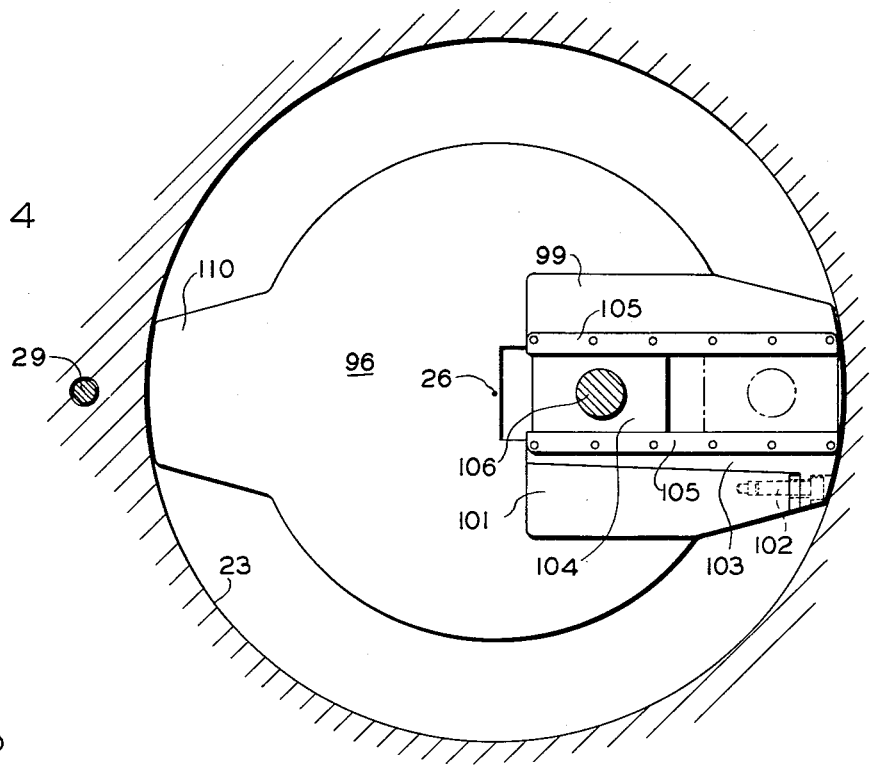
Figure 5:
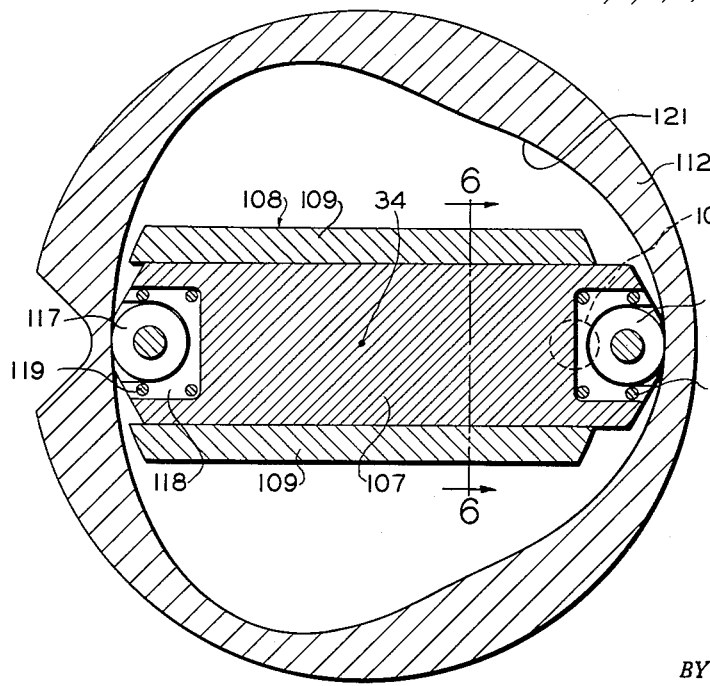
Figure 6:
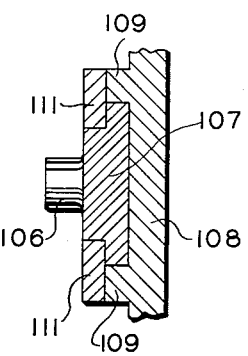
Figure 8:
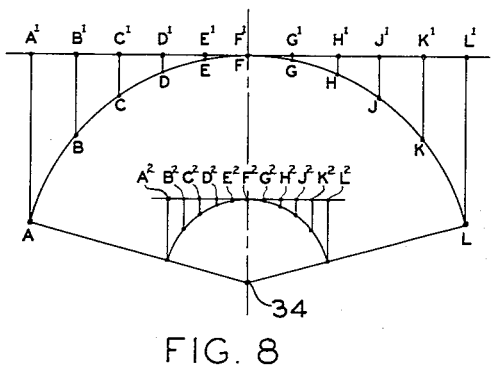
Figure 9:
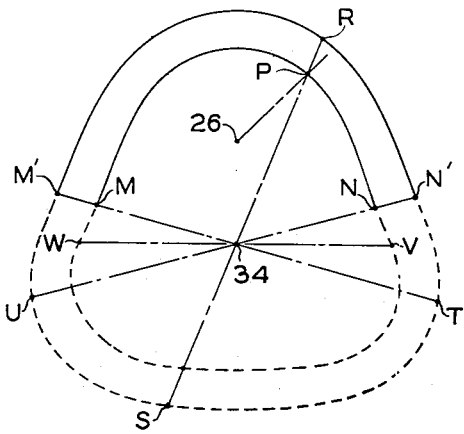
Figure 10:
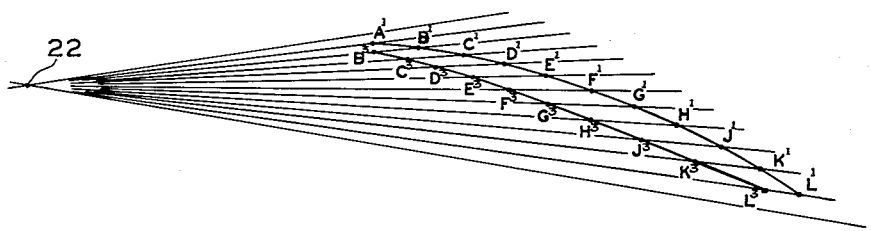
Figure 11:
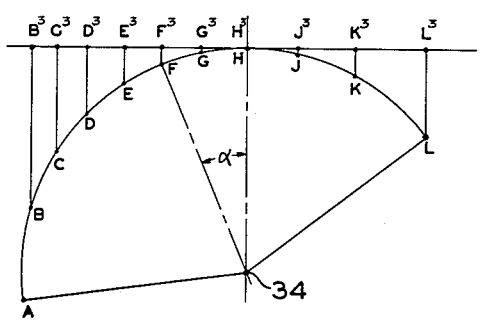

Figs. 4 and 5 are sections taken in planes indicated by lines 4—4 and 5—5, respectively of Fig. 2;

Fig. 6 is a detail sectional view taken in the plane indicated by line 6—6 of Fig. 5;

Fig. 7 is a fragmentary elevational view, similar to Fig. 1, showing a modification;

Fig. 8 is a diagram showing the relation between crank motion and tool motion during the cutting operation;

Fig. 9 is a diagram showing the path of the pivotal connection between the drive and driven members of the mechanical motion;

Fig. 10 is a diagram showing the change in the path of the tool effected by adjustment of the throw of the crank which reciprocates the tool; and, Fig. 11 is a diagram similar to Fig. 8 showing the effect of angular adjustment of the crank upon the motion of the tool.

Figure 3:
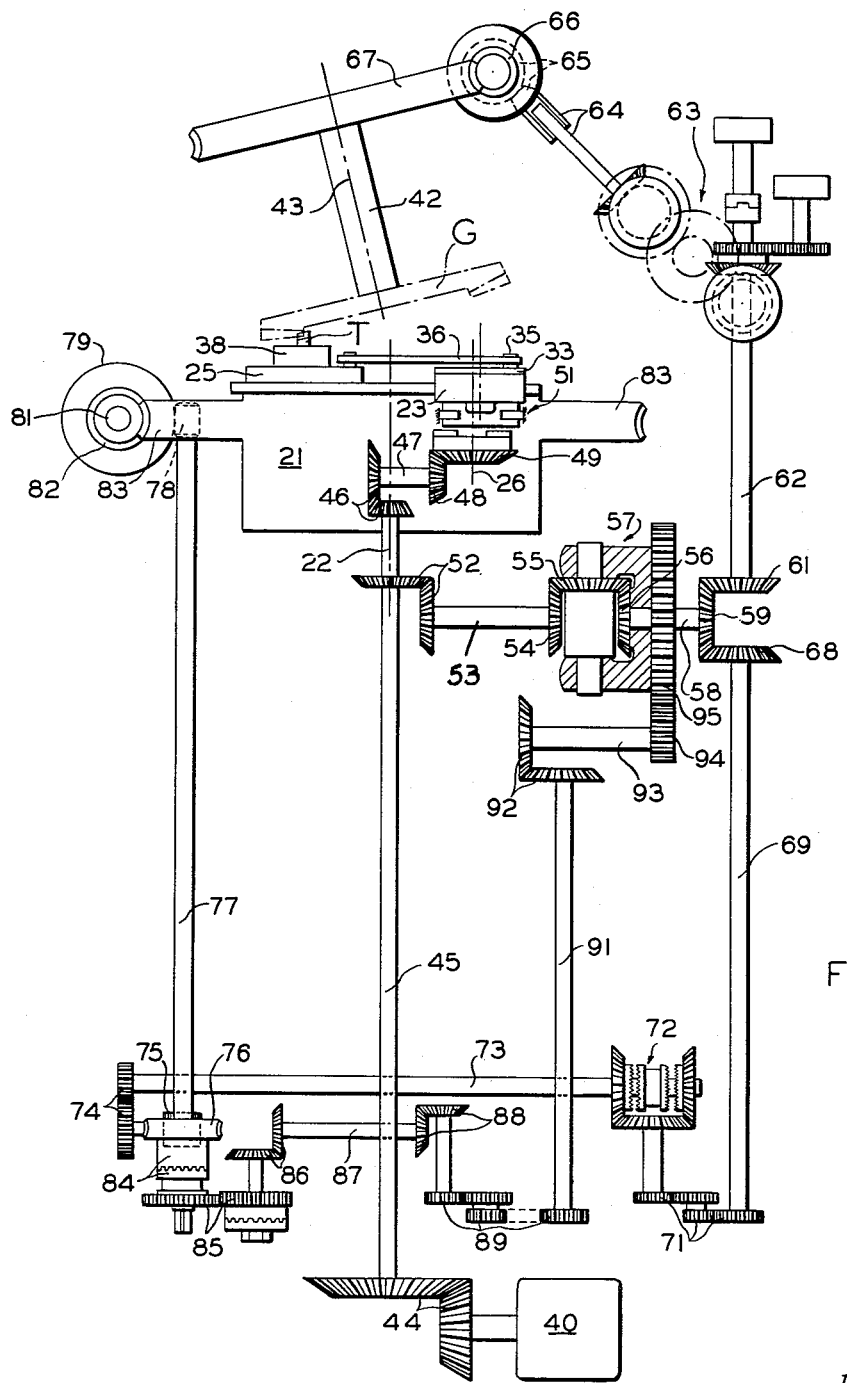
Fig. 3 is a drive diagram of the parts of the machine which the present invention concerns.

Referring first to Figs. 1, 2, and 3, for the general arrangement of the machine, there is a cradle housing 20 mounted on the machine base (not shown) and in this housing a cradle 21 is journaled for rotation about an axis 22. Carried by the cradle is an arm 23 that has ways 24 upon which there is reciprocable a tool carrier comprising a tool slide 25. The arm is adjustable to various positions upon the cradle about an axis designated 26. To provide for this adjustment the cradle has concentric about axis 26 arcuate T-slots 27 and 28 which receive bolts 29 that secure the arm. When these bolts are loosened the position of the arm may be adjusted about axis 26 by turning a pinion (not shown) that is journaled in a bracket 31 on the arm and meshes with a gear segment 32 on the cradle.

The tool slide is reciprocated by a crank 33 turning on axis 34, the pin 35 of the crank being connected to the slide by a pitman 36. The pitman is adjustable in length by being made of two sections whose contiguous surfaces are serrated and held interlocked by bolts 37. Carried by the slide 25 is a tool head 38 in which a cutting tool T is mounted by means which provide for shifting it, in the general direction of cradle axis 22, to provide tool clearance during the return of idle strokes. The means for effecting this clamping action of the tool includes a shaft 39 which telescopes within a bracket depending from the head 38 and is oscillated in time with tool reciprocation by means within a bracket 41 on arm 23. The specific operating connection between shaft 39 and tool T forms no part of the present invention and hence has not been illustrated. However, the means within bracket 41 for oscillating the shaft 39 will be described hereinafter.

The machine has a rotatable support for the work gear, designated G, and this support, shown as comprising a spindle 42 (Fig. 3), is journaled for rotation about axis 43 in a suitable work head, not shown. This head is adjustable on the machine base to bring the gear G into the proper relation to the cradle axis 22 and to the path of the reciprocating tool T. The construction and adjustment of the work head may be as taught by aforementioned Patents Nos. 1,616,439 and 1,799,883, to which reference may be made for details. The drives for the reciprocating tool and the indexing and generating motions will now be described with reference to Fig. 3. As there shown a motor 40 drives the tool crank 33 through a train comprising bevel gears 44, a main drive shaft 45 journaled in the cradle housing on the cradle axis 22, bevel gears 46, a shaft 47 journaled in the cradle 21, bevel pinion 48 on shaft 47 and a bevel ring gear 49 disposed on axis 26, and the mechanical movement, indicated generally at 51, which is journaled in arm 23 and has its driven member secured to the crank 33 for rotating as a unit therewith.

The work spindle 42 has the indexing component of its rotation imparted to it from the main drive shaft 45 through a train comprising bevel gears 52, shaft 53 journaled in the machine base, gears 54, 55, and 56 of differential gear unit 57, shaft 58 which also is journaled in the machine base, bevel pinion 59, bevel gear 61, shaft 62 journaled in the machine base, gearing designated 63 which includes ratio change gears and which corresponds to gearing designated by numerals 90 to 101 inclusive in said Patent No. 1,616,439, telescoping shaft 64 extending from the machine base to the work head, bevel gears 65, and a worm 66 and worm wheel 67 mounted within the work head, the wheel 67 being on spindle 42.

The generating roll of the cradle about its axis 22 is effected through a drive train from bevel pinion 59 which comprises bevel gear 68, shaft 69 journaled in the machine base, ratio change gears 71, reversing gear unit 72, shaft 73 journaled in the machine base, gears 74, worm 75, worm wheel 76, shaft 77 journaled in the machine base, worm 78, worm wheel 79, a shaft 81 journaled in the cradle housing, worm 82, and worm wheel 83 on the cradle.

The work spindle 42 is given a component of rotation corresponding to cradle motion, so that the work gear G will turn as though it were running in mesh a generating gear, represented by the path of reciprocating tool T on the cradle, as the generating gear turns about axis 22. This generating motion component of rotation is imparted to the spindle 42 through a train comprising shaft 77, coupling 84, spur gears 85, bevel gears 86, shaft 87, bevel gears 88, ratio change gears 89, shaft 91, bevel gears 92 shaft 93, pinion 94, and gear 95 affixed to the case of differential 57; all of which parts are mounted for rotation in the machine base. Through the differential a rotation proportional to rotation of the cradle is added to the rotation imparted through bevel gears 52 and shaft 53 as described in the second paragraph above.

The mechanical motion 51 and the associated parts of the machine will now be described in detail with reference to Figs. 1, 2, and 4 to 6. The drive member of the motion is designated 96 and has a center 97 journaled on the axis 26 in a bearing 98 in the cradle 21. Secured to the drive member is the ring gear 49 which is driven by the bevel pinion 48. The forward face of the member 96 has spaced flanges 99 and 101; and adjustably secured to flange 101 by adjusting screw 102 is a wedge 103, the channel between the flange 99 and the wedge being a guideway in which a block 104 is slidable radially of member 96. By adjustment of screw 102 the wedge 103 can be shifted relative to flange 101 to adjust the sliding clearance provided for the block. Gibs 105 secured to flange 99 and wedge 103 serve to retain the block in its guideway. A counterweight 110 for the flanges 99 and 101 is formed in diametrically opposed relation to them on the member 96.

The block 101 serves as a bearing member for a crank pin 106 that is carried by a slide 107, and the latter is arranged to move radially with respect to the driven member 108 of the mechanical motion. Member 108 has flanges 109 which together define a radial guideway for the slide. Gibs 111 are secured to the flanges for retaining the block in the guideway, as shown in Fig. 6. Member 108 is mounted for rotation relative to arm 23 about axis 34, and to this end a bearing ring 112 is secured to the arm by screws 113 and a retainer ring 114 is secured to ring 112. Disposed between the latter and the cylindrical peripheral surface of driven member 108 are radial bearing rollers 115. Between the side faces of member 108 adjacent is periphery and the adjacent side faces of rings 112 and 114 are axial thrust bearings 116.

The slide 107 at its ends carries rollers 117 which are journaled in bearings in the slide body and also in roller plates 118 that are secured to the slide body by screws 119. The rollers are arranged to roll upon a constant diameter cam surface 121 that is formed on the bearing ring 112. The shape of this cam surface will be described hereinafter in connection with Fig. 9.

From the foregoing description it will be understood that the mechanical motion includes the pivotal connection comprising crank pin 106 between the drive member 96 and driven member 108, this pivotal connection being arranged to oscillate relative to one of the members (in this case the member 96) in response to rotation of the members about their respective axes 26 and 34, and also being arranged to be oscillated relative to the other member (in this case member 108) by the stationary cam 121 and the cam follower which comprises rollers 117 on slide 107. The oscillation resulting from the rotation of the members 96 and 108 about their eccentric axes provides a relatively slow cutting stroke of the tool and a more rapid return stroke. While for this purpose it is necessary only that the path of the oscillation of the pin 106 on member 96 have a radial component, in the construction illustrated this oscillation is a reciprocation in the radial path in which block 104 moves in guideway 99, 103. Similarly while the oscillation of the pin 106 on member 108 provided by the cam 121 and cam follower 117, 107 only needs to be in a path having a radial component in order to provide the desired effect, in the illustrated construction this oscillation is a reciprocation in a radial path by reason of slide 107 operating in guideway 109, 109.

The crank plate 33 is mounted on the driven member 108 for adjustment thereon about the axis 34. The crank pin is adjustable radially of the plate 33, the latter having a slot, radial of axis 34, along which is adjustable a slide 122 that carries the crank pin 35. The slide 122 is secured in adjusted position by a gib 123 that is clamped against it by screws which extend into the crank plate. In the outer face of the crank plate 33 is a cam groove 124 in which rides a roller 125 carried by a rack 126 that is mounted to slide in the bracket 41 in a direction radial of axis 34. The teeth of the rack mesh with a pinion 127 that is mounted on the shaft 39 within the bracket.

The cam groove is so formed that the rack reciprocates in the bracket and thereby oscillates the pinion and shaft 39 in time with reciprocation of the tool T. The shape of the groove preferably is such that the tool is withdrawn relative to head 38, from its cutting position, during the terminal portion of the cutting stroke occurring after the tool has left the cut and is coming to a stop, and during the initial portion of the following return stroke. Also the shape of the groove preferably is such that the tool is advanced to cutting position during the terminal portion of the return stroke and the initial portion of the cutting stroke occurring before the tool has actually entered the cut.

For the purpose of securing the crank plate 33 in various adjusted positions around the driven member 108, the plate is provided with arcuate slots 128 for passing securing bolts 129, and the member 108 is provided with a series of spaced circularly arranged threaded holes (not shown) for receiving these bolts. Small adjustments that are commensurate with the lengths of slots 128 may be made by merely loosening the bolts, while larger adjustments require that the bolts be moved to different threaded holes in member 108. When the bolts are loosened or removed the adjustment may be made by turning set screws 131 which are screw threaded to a bracket 132 and bear against a lug 133 on the crank plate. Bracket 132 is secured to the member 108 in any of various positions thereabout by screws 134 threaded into openings that are provided around member 108 for this purpose. The effect of adjusting the crank plate on the member 108 will be discussed hereinafter in connection with Figs. 10 and 11.

A modification of the crank arrangement is shown in Fig. 7, in which the crank pin 35 instead of being connected to the tool slide by pitman 36 is connected thereto through a sliding yoke 135. The pin 35 is journaled in a block 136 that is slidable in a transverse guide slot 137 in the yoke, the latter in turn sliding on guide rails 138 that are secured to arm 23 in parallel relation to ways 24. The yoke has a two part, adjustable length, extension 139 which connects it to the tool slide. With this modification the tool T would of course have pure harmonic motion if the crank pin 35 rotated at constant velocity, whereas with the arrangement first described the motion would be affected by the effective fore-shortening of pitman 36 in all positions thereof except at the ends of its stroke.

In operation of the machine the drive member 96 is rotated at substantially constant velocity by the motor driven gear train hereinbefore described, and the crank pin 106 (which is guided by the radial slot in which block 101 slides) is therefore carried about axis 26 at a constant angular velocity. At the same time the pin 106 is moved radially of both the drive member 96 and the driven member 108 by action of the cam surface 121 on the rollers 117 of the slide 107 which carries the pin. The cam surface may be so designed that the tool T will move at constant velocity during at least that part of its cutting stroke in which it is actually cutting, and that it will return at a higher, although varying, velocity. The manner in which this may be accomplished with the present invention will be explained in connection with Figs. 8 and 9.

In Fig. 8 the arc A—L represents the part of the circular path of the crank pin 35 during which the tool T is cutting, and line A¹—L¹ the corresponding path of the tool T (it being assumed for purpose of this illustration that the yoke type of crank pin to tool head connection shown in Fig. 7 is employed). As shown equal increments of tool motion A¹—B¹, B¹—C¹, C¹—D¹, etc., subtend unequal arc portions A—B, B—C, C—D, etc. of the arc A—L, the end arcs A—B and K—L being largest and the middle arcs E—F and F—G smallest. In other words to obtain constant tool velocity during the cut, the crank pin's angular velocity decreases at a varying rate until the tool reaches the center of its stroke, and then increases at an oppositely varying rate. With the arrangement shown in Fig. 7 this cyclical change in angular velocity of the crank pin 35 throughout its rotation remains the same regardless of adjustment of the throw of the crank pin. Thus if the throw of the pin is reduced so that its arc of travel during cutting is as shown by the arc of small radius in Fig. 8, the motion of the tool will be by still equal although smaller increments A²—B², B²—C², C²—D², etc. for corresponding angular increments of motion of the crank pin represented by the arcs A—B, B—C, C—D, etc.

Turning now to Fig. 9, there are shown points representing the axes 26 and 34, and point P representing the center of crank pin 106. Line 26–P may be considered to represent the drive member 96 which rotates at constant velocity about axis 26, and line 34–P to represent the driven member 108 which rotates at varying velocity about axis 34. While line 34–P rotates through an angle corresponding to travel of the crank pin 35 through arc A—L of Fig. 8, the point P will follow the full line curved path from M to N. The shape of this path may be determined by the intersection of lines 26–P and 34–P, when line 26–P is moved by equal angular increments representing the constant angular velocity of the drive member 96 and line 34–P is moved by unequal angular increments that correspond to arcs A—B, B—C, C—D, etc. of Fig. 8.

Having thus determined the path of the center P of crank pin 106 about axis 34 that is necessary to achieve constant velocity of the tool T when cutting, the shape of cam 121 can now be determined. On line 34–P points R and S are placed to represent the centers of rollers 117. If, while maintaining constant the distances S—P and P—R (which in the physical apparatus is the function of slide 107), the line 34–P is rotated about axis 34 while point P is maintained on the full line path M—N, the point R will trace the full line path M'—N' and the point S the dotted line path T—U. The path M'—R—N'—T—S—U—M' is then completed by providing connecting sections U—M' and N'—T, these sections preferably being designed with a view to obtaining reasonable accelerations of the driven member 108 as it traverses them. The complete path is, of course, the path followed by the centers of rollers 117, but from it the shape of the cam 121 can be readily determined by taking into account the size of the rollers.

When the pitman 36 (Fig. 1) is employed instead of the yoke 135 (Fig. 7), constant cutting velocity of the tool may be obtained by designing the cam by the general method described in the preceding two paragraphs. However, as hereinbefore indicated the increments of angular motion of crank pin 35 that are necessary in order to obtain equal increments of tool motion will be somewhat different than shown in Fig. 8, and this must be taken into account in design of the cam. Moreover a cam so designed will give uniform tool cutting velocity only when the crank throw bears one particular ratio to pitman length. When the stroke of the tool head is changed by adjusting slide 122 in the crank plate, it is also necessary to make a proportionate change in the length of pitman 36 if constant cutting velocity is to be retained. However in many cases it is not necessary that the cutting velocity of the tool be absolutely constant, and for such cases a cam 121 designed for use with the yoke 135 of Fig. 7 may be satisfactory for use in a machine having the pitman 36 of Fig. 1. In either case the cutting velocity of the tool will be near enough to constant that the gear teeth produced will have a single lengthwise curvature and not the double or S-shaped curvature hereinbefore referred to as being objectionable.

In accordance with this invention the cam 121 may also be designed to give any other selected non-harmonic motion of the tool while it is cutting. For instance the cam may be designed to decrease the tool velocity with decreasing distance from the cradle center, to thereby provide a uniform tool clearance angle.

Fig. 10 shows at $A^1$—$L^1$ the curved path that would be traced by a tool T moving at constant velocity while the cradle rolls at constant velocity about its axis 22, it being assumed for this illustration that the arm 23 is so adjusted about axis 26 that the path of the tool T on ways 24 is radial of the cradle axis. As shown the curve $A^1$—$L^1$ of Fig. 10 is constructed by spacing points $A^1$, $B^1$, $C^1$, etc. distances from each other measured radially from center 22 that are equal to the distances these same points are spaced in Fig. 8, and by placing them on successive, equally spaced radii from center 22. The radii are spaced from each other by increments which represent the motion of the work which takes place while the tool is cutting.

The effect of angular adjustment of the crank plate 33 relative to driven member 103 about axis 34 is illustrated in Figs. 10 and 11. In the latter view the arc A—L is adjusted through an angle α from the position thereof in Fig. 8, with the result that the increments subtended by the arcs B—C, C—D, D—E, etc. on the straight line representing the stroke of the tool are no longer equal, as are increments $B^1$—$C^1$, $C^1$—$D^1$, $D^1$—$E^1$ etc. in Fig. 8, but are the obviously unequal increments $B^3$—$C^3$, $C^3$—$D^3$, $D^3$—$E^3$, etc., showing that by adjusting the crank plate on the driven member the cutting velocity of the tool is varied. The effect of this on the path of the cutting tool (and hence on the lengthwise curvature of the gear teeth produced by the machine) is shown in Fig. 10 where the increments $B^3$—$C^3$, $C^3$—$D^3$, etc., are plotted on the same equi-spaced radii as were the increments $B^1$—$C^1$, $C^1$—$D^1$, etc. The resulting curve $B^3$—$L^3$ will be seen to be clearly of different curvature than the curve $B^1$—$L^1$. It will be understood that for the purpose of clear illustration the difference in curves $A^1$—$L^1$ and $B^3$—$L^3$ in Fig. 10 is greatly magnified from what would be used in practice to obtain tooth bearing mismatch, for ordinarily such mismatch will not amount to more than a few thousandths of an inch from end to end of the teeth.

It will now be understood how the present invention provides, in the adjustment of the crank plate 33 on the driven member 103, a means whereby the teeth of mating gears may be cut with the desired degree of lengthwise curvature mismatch to produce tooth bearings of the desired length. These mismatched tooth curvatures may be made tangent at any position along the teeth, by a slight change of tooth spiral angle, which may be accomplished either by a slight adjustment of the stroke of the tool or of the arm 23 on the cradle about axis 26. In either way the tooth bearing may be shifted to whatever position is desired along the length of the teeth.

The provision by the present invention of a fast return stroke for the tool is shown by Fig. 9. Consider the line 26–P to represent the drive member 96 (Figs. 2 and 4) which makes one revolution for each complete reciprocation cycle of the tool, and line 34–P to represent the crank 33, 35 which turns 180° on each stroke of the tool. It will be seen that to produce such a movement of line 34—P, through 180° angle W–34–V (measured clockwise) the line 26–P must traverse the obtuse angle W–26–V of approximately 245° in Fig. 9. To produce the other one-half turn of line 34–P through angle V–34–W, the line 26–P need traverse only the acute angle V–26–W, of about 115°. Thus the return stroke is over twice as fast as the cutting stroke. The relative speeds of the two strokes of course can be varied as desired by changing the proportions of the parts.

The foregoing disclosure is made by way of example to illustrate and explain the inventive principles involved, and not by way of limitation, there being no intention to limit the scope of the invention except as may be required by the appended claims.

I claim as my invention:

1. A gear cutting machine having a rotatable work support, a tool support, a tool carrier reciprocable on the tool support, a rotatable tool drive member connected to the work support to move in predetermined velocity relationship therewith, a driven member having rotatable therewith a crank for reciprocating the tool carrier, and a variable leverage connection between the drive and driven members for causing them to move in varying velocity relationship to each other, said variable leverage connection including a cam that is shaped to provide a non-harmonic motion of the tool carrier during at least the cutting portion of its operating cycle.

2. A machine as characterized by claim 1 in which there is a means for adjusting the phase relationship of the driven member and the crank to thereby change the character of said non-harmonic motion of the tool carrier.

3. A gear cutting machine as characterized in claim 1 in which one of said supports is mounted on a rotatable cradle, and the cradle is geared to the work support whereby said supports rotate relative to each other about the axis of rotation of the work support and the cradle in predetermined velocity relationship.

4. A gear cutting machine having a rotatable work support, a tool support, a tool carrier reciprocable on the tool support, a rotatable tool drive member connected to the work support for rotation in predetermined velocity ratio thereto, a driven member having rotatable therewith a crank for reciprocating the tool carrier, said drive and driven members being mounted on the tool support to turn on eccentric axes, a pivotal connection between said members that is arranged to oscillate relative to one of them, in a path having a radial component, in response to their rotation about said eccentric axes, and a cam and cam follower, one of which is on said pivotal connection, for oscillating said pivotal connection relative to the other one of said members in a path which also has a radial component.

5. A gear cutting machine as characterized by claim 4 in which the cam is so shaped that during at least a portion of one stroke of the tool carrier the latter moves in constant velocity relationship to the tool drive member.

6. A gear cutting machine as characterized by claim 4 in which the throw of the crank is adjustable to vary the stroke of the tool carrier.

7. A gear cutting machine characterized by claim 4 in which the crank is adjustable angularly about the axis of the driven member.

8. A gear cutting machine as characterized by claim 4 in which the pivotal connection comprises a crank pin that is arranged to be oscillated on said other one of said members by said cam and cam follower.

9. A gear cutting machine as characterized by claim 8 in which the crank pin is carried by a slide that is arranged to be reciprocated upon said other one of said members by said cam and cam follower.

10. A gear cutting machine as characterized by claim 9 in which the cam and cam follower comprise a cam that is stationary with respect to the tool support and roller follower means on the slide engaging opposed surface portions of the cam.

11. A gear cutting machine as characterized by claim 4 in which said other one of the cam and cam follower is stationary with respect to the tool support.

12. A gear cutting machine having a rotatable work support, a tool support, a tool carrier reciprocable on the tool support, a rotatable tool drive member connected to the work support for rotation in predetermined velocity ratio thereto, a driven member having rotatable therewith a crank for reciprocating the tool carrier, said drive and driven members being mounted on the tool support to turn on eccentric axes, a pivotal drive connection between said members arranged to move relative to both of them, the pivotal connection moving relative to one of the members in response to their rotation about said eccentric axes, and cam means for moving the pivotal connection relative to the other of said members as it rotates.

13. A gear cutting machine as characterized by claim 12 in which the cam means includes a continuous cam surface that is stationary relative to said eccentric axes and a pair of cam followers carried by the pivotal connection and both arranged for continuous contact with said cam surface.

14. A gear cutting machine as characterized by claim 13 in which said continuous cam surface is an internal surface.

References Cited in the file of this patent

UNITED STATES PATENTS

| | | |
|---|---|---|
| 305,520 | Juengst | Sept. 23, 1884 |
| 436,139 | Juengst | Sept. 9, 1890 |
| 1,616,439 | Candee et al. | Feb. 8, 1927 |
| 1,797,341 | Hill | Mar. 24, 1931 |
| 1,918,784 | Rode | July 18, 1933 |
| 2,036,912 | Bollman et al. | Apr. 7, 1936 |
| 2,361,599 | Candee | Oct. 31, 1944 |